United States Patent [19]

Kroll et al.

[11] Patent Number: 4,887,430

[45] Date of Patent: Dec. 19, 1989

[54] BISTABLE SME ACTUATOR WITH RETAINER

[75] Inventors: John W. Kroll, Greendale; Michael S. Baran, Wauwatosa; James E. Mading, Sussex, all of Wis.

[73] Assignee: Eaton Corporation, Cleveland, Ohio

[21] Appl. No.: 288,077

[22] Filed: Dec. 21, 1988

[51] Int. Cl.[4] ............................................. F03G 7/06
[52] U.S. Cl. ...................................... 60/527; 60/528; 337/140
[58] Field of Search ..................... 60/527, 528, 529; 337/140

[56] References Cited

U.S. PATENT DOCUMENTS

| | | | |
|---|---|---|---|
| 3,652,969 | 3/1972 | Willson et al. | 337/140 |
| 3,725,835 | 4/1973 | Hopkins et al. | 337/140 |
| 4,055,955 | 11/1977 | Johnson | 60/527 |
| 4,191,053 | 3/1980 | Hart et al. | 73/363.1 |
| 4,284,235 | 8/1981 | Diermayer et al. | 236/1 G |
| 4,302,939 | 12/1981 | Golestaneh | 60/527 |
| 4,325,217 | 4/1982 | Golestaneh | 60/527 |
| 4,337,892 | 7/1982 | Diermayer et al. | 236/93 R |
| 4,405,387 | 9/1983 | Albrecht et al. | 148/11.5 R |
| 4,411,711 | 10/1983 | Albrecht et al. | 148/11.5 A |
| 4,416,706 | 11/1983 | Albrecht et al. | 148/11.5 C |
| 4,484,955 | 11/1984 | Hochstein | 148/11.5 R |
| 4,485,839 | 12/1984 | Ward | 164/463 |
| 4,517,543 | 5/1985 | Brubaker | 337/140 |
| 4,522,147 | 6/1985 | Kroll et al. | 116/216 |
| 4,544,988 | 10/1985 | Hochstein | 361/211 |
| 4,596,483 | 6/1986 | Gabriel | 403/28 |
| 4,772,807 | 9/1988 | Bouvot | 60/527 |

Primary Examiner—Allen M. Ostrager
Attorney, Agent, or Firm—Ancrus, Sceales, Starke & Sawall

[57] ABSTRACT

In a bistable shape memory effect, SME, mechanism having first and second opposing shape memory effect, SME, elements (16, 20) moving an actuator (12) along a travel stroke between respective first and second positions upon heating of the respective SME element above its transition temperature mechanical frictional retainers are provided for holding the actuator at the end of its travel stroke, including after cooling of the respective SME element and return repose movement thereof. One embodiment provides a detent retainer (38, 40, 42, 44, 46). Another embodiment provides a friction wedge retainer (12a, 12b, 14a, 14b, 12c, 12d, 14c, 14d). Another embodiment provides a resiliently biased friction member (50, 52) and a lost motion coupling (56, 58) between the actuator and the SME elements.

19 Claims, 2 Drawing Sheets

BISTABLE SME ACTUATOR WITH RETAINER

BACKGROUND AND SUMMARY

The invention relates to bistable shape memory effect, SME, actuators, and more particularly to improvements for retaining the actuator at the end of its travel stroke.

SME alloys are known in the art and exhibit a given mechanical movement in response to heating above a transition temperature. The movement is definite, predictable and repeatable. A one-way SME element can be externally biased to return to its original position upon cooling below the transition temperature. A two-way SME element returns without external bias.

Bistable SME actuators are known in the art. A pair of opposing SME elements are connected to an actuator movable along a travel stroke between first and second positions. The first SME element may be heated by directing electric current flow therethrough to heat the SME element above its transition temperature to move the actuator to its first position. After cooling of the first SME element, the actuator may be moved to its second position by heating the second SME element, e.g. by directing electric current flow therethrough.

Hopkins et al U.S. Pat. No. 3,725,835 shows a bistable SME mechanism having an actuator 37–39, and first and second SME elements 29 and 33 coupled to the actuator and moving the actuator between respective first and second positions upon current flow through the respective SME elements causing heating thereof above the transition temperature.

Hochstein U.S. Pat. No. 4,544,988 shows a bistable SME mechanism with magnetic retaining means at the end of the travel stroke of the actuator.

The present invention provides various retainers for retaining the actuator at the end of its travel stroke, including upon cooling of a one-way SME element which may otherwise cause slight return repose movement of the SME element.

DETAILED DESCRIPTION

Figure 1:
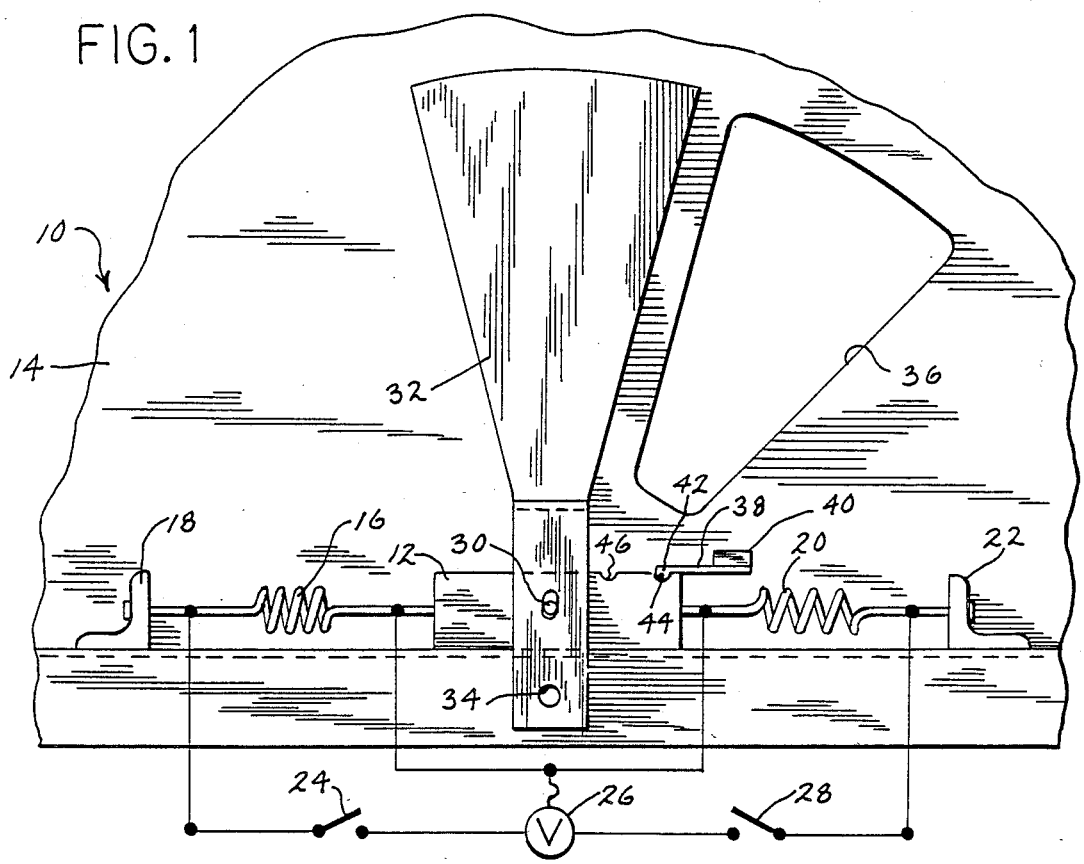
FIG. 1 shows a bistable SME mechanism in accordance with the invention.
Figure 2:
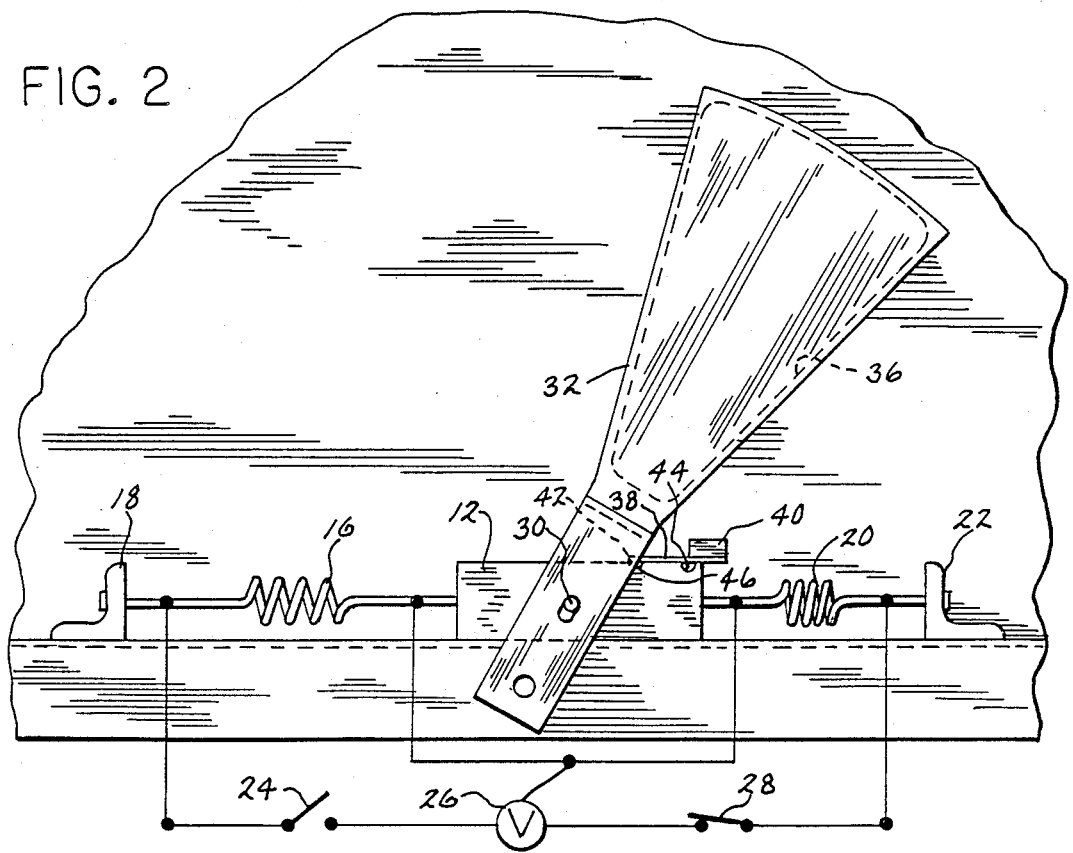
FIG. 2 shows the mechanism of FIG. 1 in an alternate position.

FIG. 1 shows a bistable shape memory effect, SME, mechanism 10. An actuator block 12 in housing 14 moves left-right along a travel stroke between a first position as shown in FIG. 1, and a second position as shown in FIG. 2. A first SME element is provided by SME spring 16 extending between and attached to anchor bracket 18 and actuator block 12. A second SME element is provided by SME spring 20 extending between and attached to anchor bracket 22 and actuator block 12. Each of springs 16 and 20 is a one-way SME element which contracts when heated above its transition temperature.

Upon closing switch 24, current flows from voltage source 26 through SME element 12 causing heating of the latter above its transition temperature, to in turn move actuator block 12 leftwardly to its first position as shown in FIG. 1. Since spring 16 is a one-way SME element, actuator block 12 will stay in its leftward position upon cooling of SME element 16 below its transition temperature upon opening of switch 24. This is desirable because actuator block 12 may be actuated to its leftward position by only a momentary pulse of current sufficient to raise the temperature of SME element 16 above its transition temperature, whereafter power need no longer be supplied from voltage source 26. This provides an energy savings by eliminating the need to continuously energize the mechanism. Instead, the mechanism need only be pulsed to its actuated condition.

Upon closure of switch 28, current flows from voltage source 26 through SME element 20, causing heating of the latter above its transition temperature, to in turn move actuator block 12 rightwardly to its second position as shown in FIG. 2. Since spring 20 is a one-way SME element, switch 28 may be opened to permit cooling of SME element 20, and actuator block 12 stays in its rightward position. As above, this is desirable because it eliminates the need for continued energization from voltage source 26, and instead only requires pulsed energization sufficient to raise the temperature of SME element 20 above its transition temperature. Upon sufficient cooling of SME element 20, the mechanism may be actuated again to its leftward position in FIG. 1 by closing switch 24. Likewise, upon sufficient cooling of SME element 16, actuator block 12 may be actuated to its rightward position in FIG. 2 by closing switch 28.

Actuator block 12 may perform a variety of functions, such as tripping an electric switch, for example as shown at 32 in Brubaker U.S. Pat. No. 4,517,543, moving a shutter or flag to interrupt an optic beam as at 22 in Kroll et al U.S. Pat. No. 4,522,147, or operating a variety of valves, variable resistors, sensors, etc. In the disclosed embodiment, actuator block 12 has a trunnion 30 pivoting a door 32 about pivot point 34 on the housing to open an air duct 36, FIG. 1, or to close same, FIG. 2.

A retainer 38 is mounted by anchor block 40 to housing 14. Retainer 38 mechanically frictionally holds actuator 12 at the end of its travel stroke in at least one of the left and right positions until actuated to the other position by heating of the respective SME element. Retainer 38 is a leaf spring having a rounded end 42 bearing in detent groove 44 in actuator block 12 in the left position of the actuator, FIG. 1, and bearing in detent groove 46 in actuator 12 in the right position of the actuator, FIG. 2. The strength of leaf spring 38 is chosen to have a holding force on actuator 12 in its leftward position stronger than the bias of spring 20 until the latter is heated above its transition temperature, and to have a holding force on actuator 12 in its rightward position, FIG. 2, stronger than the bias of spring 16 until the latter is heated above its transition temperature. This retention at the end of the travel stroke ensures that actuator 12 will stay in its fully traveled position even upon cooling of the respective SME element and any slight attempted return repose movement of the latter.

Figure 3:
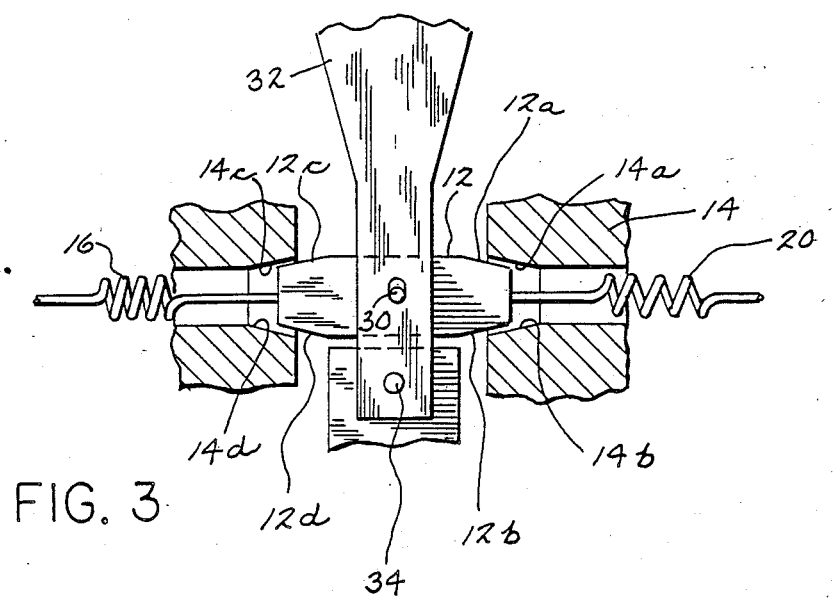
FIG. 3 shows an alternate embodiment of the invention.

FIG. 3 shows an alternate embodiment of the retaining means. The housing has friction wedge surfaces 14a and 14b tapered to mate with friction surfaces 12a and 12b of the actuator and provide a tighter fit the further the travel stroke. The left end of the travel stroke is likewise provided with a friction wedge retainer provided by tapered housing friction surfaces 14c and 14d and tapered actuator block surfaces 12c and 12d.

Figure 4:
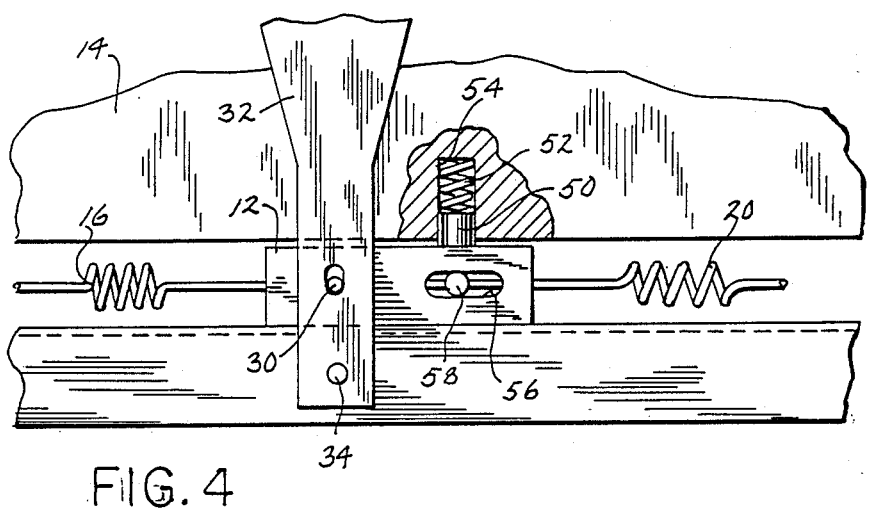
FIG. 4 shows another alternate embodiment of the invention.

FIG. 4 shows another alternate embodiment of the retaining means. A friction block member 50 is resiliently biased by compression spring 52 against actuator 12 to apply a force against the actuator generally perpendicularly to the direction of its left-right travel stroke. Housing 14 has a recess 54 therein extending perpendicularly to the direction of the travel stroke of actuator 12. Compression spring 52 and friction block 50 are disposed in recess 54, with compression spring 52 biasing friction block 50 to extend externally of recess 54 and into engagement with actuator block 12.

A lost motion coupling is provided by a slot 56 in the actuator block. Slot 56 is elongated left-right in the direction of the travel stroke of the actuator. A trunnion 58 is movable along slot 56 and is connected in common to each of SME elements 16 and 20. SME elements 16 and 20 are not connected to actuator 12, but rather slide freely therethrough or extend therebehind. Upon heating of SME element 16 and movement of actuator 12 leftwardly along its travel stroke to its first position, and then upon cooling of SME element 16, the lost motion coupling of trunnion 58 in slot 56 permits limited return repose movement of SME element 16 without moving actuator 12 from its leftward position. The lost motion of trunnion 58 in slot 56 permits return repose movement of SME element 16 by an amount equal to such lost motion without causing return rightward movement of actuator 12. The amount of lost motion is equal to the left-right length of slot 56 minus the diameter of trunnion 58. Actuator 12 is held at its left position by the perpendicular bias force of resiliently biased friction member 50.

Upon heating of SME element 20, actuator 12 moves rightwardly along its travel stroke to its second position, FIG. 2. SME element 20 may repose upon cooling, without moving actuator 12 away from its rightward position. The noted lost motion of trunnion 58 in elongated slot 56 permits return repose movement of SME element 20 by an amount equal to such lost motion, without causing return leftward movement of actuator 12. Actuator 12 is held at its noted rightward position by the perpendicular bias force of resiliently biased friction member 50.

It is contemplated within the invention to heat the SME elements in various other manners, for example a directed stream of heated fluid, gaseous or liquid, directed radiant heat, etc.

It is recognized that various equivalents, alternatives and modifications are possible within the scope of the appended claims.

We claim:

1. A bistable shape memory effect, SME, mechanism comprising:
    a housing;
    an actuator in said housing for actuation along a travel stroke between first and second positions;
    a first SME element in said housing and coupled to said actuator and moving said actuator to said first position upon heating of said first SME element above its transition temperature;
    a second SME element in said housing and coupled to said actuator and moving said actuator to second position upon heating of said second SME element above its transition temperature;
    retaining means mechanically frictionally holding said actuator at the end of its travel stroke in one of said positions until actuated to the other position by heating of the respective SME element.

2. The invention according to claim 1 wherein said retaining means has a holding force on said actuator in said one position stronger than the bias of said respective SME element until the latter is heated above its transition temperature.

3. The invention according to claim 2 wherein said retaining means comprises detent means holding said actuator in said one position.

4. The invention according to claim 2 wherein said retaining means comprises friction wedge means at said end of the travel stroke of said actuator.

5. The invention according to claim 4 wherein said friction wedge means comprises tapered friction surfaces having a tighter fit the further the travel stroke.

6. The invention according to claim 2 wherein said retaining means comprises a resiliently biased friction member applying a force against said actuator generally perpendicularly to the direction of said travel stroke, and comprising a lost motion coupling between said actuator and said SME elements.

7. The invention according to claim 1 wherein said SME elements are heated by electric current.

8. A bistable shape memory effect, SME, mechanism comprising:
    a housing;
    an actuator in said housing for actuation along a travel stroke between first and second positions;
    a first SME element in said housing and coupled to said actuator and moving said actuator to said first position upon heating of said first SME element above its transition temperature;
    a second SME element in said housing and coupled to said actuator and moving said actuator to said second position upon heating of said second SME element above its transition temperature;
    retaining means mechanically frictionally holding said actuator at each end of its travel stroke until actuated to its other position by heating of the respective SME element.

9. The invention according to claim 8 wherein said retaining means has a holding force on said actuator in said first position stronger than the bias of said second SME element until the latter is heated above its transition temperature, and wherein said retaining means has a holding force on said actuator in said second position stronger than the bias of said first SME element until the latter is heated above its transition temperature.

10. The invention according to claim 9 wherein said retaining means comprises detent means holding said actuator in each of said first and second positions.

11. The invention according to claim 9 wherein said retaining means comprises friction wedge means at each end of the travel stroke of said actuator.

12. The invention according to claim 9 wherein said retaining means comprises a resiliently biased friction member applying a force against said actuator generally perpendicularly to the direction of said travel stroke.

13. The invention according to claim 8 wherein said SME elements are heated by electric current.

14. A bistable shape memory effect, SME, mechanism comprising:
    a housing;
    an actuator in said housing for actuation along a travel stroke between first and second positions;
    a first SME element in said housing and coupled to said actuator and moving said actuator to said first position upon heating of said first SME element above its transition temperature;

a second SME element in said housing and coupled to said actuator and moving said actuator to said second position upon heating of said second SME element above its transition temperature;

a resiliently biased friction member applying a force against said actuator generally perpendicularly to the direction of said travel stroke, and a lost motion coupling between said actuator and said SME elements providing lost motion along the direction of said travel stroke, such that after heating of said first SME element and movement of said actuator along its travel stroke to said first position, said first SME element is allowed to repose upon cooling, without moving said actuator from said first position, said lost motion permitting return repose movement of said first SME element by an amount equal to said lost motion without causing return movement of said actuator, said actuator being held at said first position by said perpendicular bias force of said resilient friction member, and such that after heating of said second SME element and movement of said actuator along its travel stroke to said second position, said second SME element is allowed to repose upon cooling, without moving said actuator from said second position, said lost motion permitting return repose movement of said second SME element by an amount equal to said lost motion without causing return movement of said actuator, said actuator being held at said second position by said perpendicular bias force of said resilient friction member.

15. The invention according to claim 14 wherein said resiliently biased friction member comprises a compression spring and a friction block mounted to one of said housing and said actuator and biased against the other of said housing and said actuator.

16. The invention according to claim 15 wherein said housing has a recess therein extending perpendicularly to said direction of said travel stroke of said actuator, and wherein said compression spring and said friction block are disposed in said recess, said compression spring biasing said friction block to extend externally of said recess and into engagement with said actuator.

17. The invention according to claim 14 wherein said lost motion coupling comprises an elongated slot in said actuator, said slot being elongated in the direction of said travel stroke of said actuator, and a trunnion movable along said slot and connected in common to each of said SME elements.

18. The invention according to claim 17 wherein the amount of said lost motion is equal to the length of said slot along said travel stroke direction minus the diameter of said trunnion.

19. The invention according to claim 14 wherein said SME elements are heated by electric current.

* * * * *